United States Patent [19]

Sato et al.

[11] 4,293,742
[45] Oct. 6, 1981

[54] MICROPHONE DEVICE

[75] Inventors: Masanobu Sato, Hachioji; Ken Satoh, Akigawa, both of Japan

[73] Assignee: Olympus Optical Company Limited, Tokyo, Japan

[21] Appl. No.: 77,721

[22] Filed: Sep. 21, 1979

[30] Foreign Application Priority Data

Sep. 25, 1978 [JP] Japan .......................... 53-131512[U]

[51] Int. Cl.³ .......................... G11B 31/00; H04B 1/06
[52] U.S. Cl. .................................... 179/178; 360/137; 369/10
[58] Field of Search .................. 179/178, 146 R, 147, 179/148, 152, 153, 100.11, 100.12 R; 360/137

[56] References Cited

U.S. PATENT DOCUMENTS

| | | | |
|---|---|---|---|
| 3,326,188 | 6/1967 | Long | 179/146 R |
| 4,041,250 | 8/1977 | Sato | 360/137 |
| 4,199,724 | 4/1980 | Kondo | 179/100.11 |

Primary Examiner—Thomas A. Robinson
Attorney, Agent, or Firm—Toren, McGeady and Stanger

[57] ABSTRACT

A microphone device detachably fitted to acoustic equipments such as tape recorders comprises a body detachably fitted to the acoustic equipment, a flexible cylindrical arm mounted to the body, a microphone provided to the free end of the arm, and a flexible conductor disposed in the hollow space of the arm for electrically connecting the microphone with the body.

6 Claims, 6 Drawing Figures

MICROPHONE DEVICE

BACKGROUND OF THE INVENTION

1. Field of the Invention

The present invention relates to a microphone device, and more particularly to a microphone device which is detachably fitted to acoustic equipment such as tape recorders.

2. Description of Prior Art

It is a recent trend that the size of the tape recorder is becoming increasingly small and most of the small tape recorders now being used incorporate a non-directional microphone.

To record conversations with a tape recorder, one must place it close to a speaker. In this case, however, since the microphone built into the tape recorder is non-directional, the tape recorder may record surrounding noise at high level together with the conversation one wants to record.

To avoid this inconvenience, it is conventional that an external microphone with directivity is connected through a cord to the tape recorder and brought close to the speaker by reaching with a hand to record the conversation.

However, in cases where one has to record the speaker's words from behind a crowd of interviewers, one cannot put the microphone close enough to the speaker even by reaching with his hand. As a result a desired level of recording may not be obtained. Recently, condenser microphones are beginning to be used as an external microphone. A condenser microphone, however, has a disadvantage that it needs a special DC power supply resulting in increased weight and larger size, which in turn makes it difficult to handle.

SUMMARY OF THE INVENTION

An object of the present invention is to eliminate the above-described drawbacks of the microphone device.

Another object of this invention is to provide a microphone device which is small in size and weight and easy to handle and whose microphone can be extended over a required distance to enable appropriate recording.

To achieve the above objectives, the microphone device according to this invention comprises a body detachably mounted to acoustic equipments, a flexible cylindrical arm fitted to the body, a microphone provided to the free end of the arm, and conductors disposed in the hollow space of the arm for electrically connecting the microphone to the body. This microphone device employs a condensor microphone, which is supplied electricity from the acoustic equipment. The body of the microphone device is provided with a screw and connector terminals, and can be detachably secured to the acoustic equipment by fastening the screw into the corresponding screw holes formed on the acoustic equipment. The screw is rotated by turning a knob. The body can also be electrically connected to the acoustic equipment by plugging its connector terminals to the corresponding connector terminals on the equipment.

DESCRIPTION OF THE PREFERRED EMBODIMENT

Figure 1:
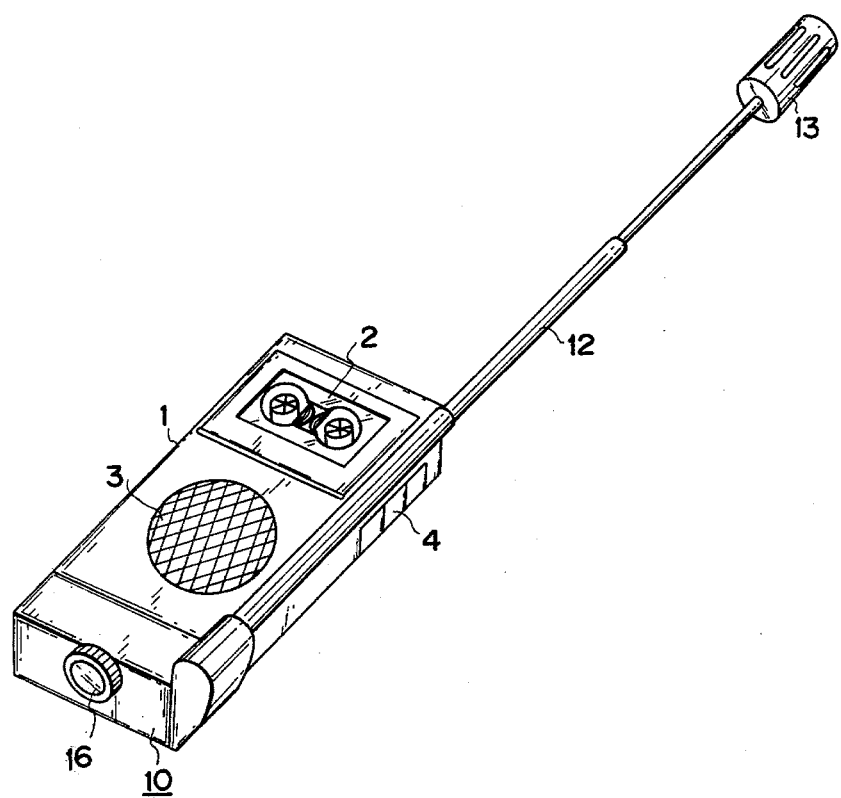
FIG. 1 is a perspective view of a microphone device of this invention as fitted to the tape recorder.

In FIG. 1 a tape recorder 1 includes a cassette chamber 2 and speaker 3 on the front and a group of operation buttons 4 on its side. At one end surface the tape recorder is provided with a screw hole (not shown) for detachably securing the microphone device 10 of this invention and also with connector terminals (not shown) for electrically connecting the microphone 10 to the internal circuit of the tape recorder.

Figure 2:
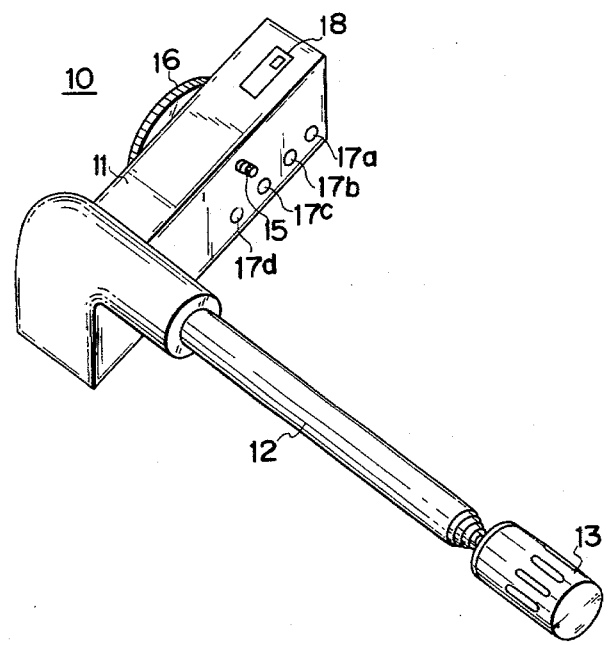
FIG. 2 is a perspective view of a microphone device of one embodiment.
Figure 3:
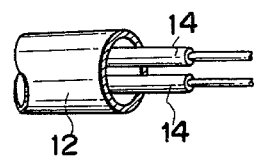
FIG. 3 is a perspective view of an essential portion of the microphone device as illustrated in FIG. 2.

In FIG. 2, the body 11 of the microphone device 10 has an arm 12 equipped at its free end with a condenser microphone 13 which exhibits directivity. The arm 12 is an expandable telescopic tube made up of a number of smaller tubes to enable the microphone 13 to be extended over a required distance. As shown in FIG. 3, the arm 12 forms a hollow space which contains a pair of flexible conductors 14 which have the same construction as the arm 12, i.e, telescoping, and connect the microphone 13 to the body 11.

The body 11 carries a projecting fixing screw 15 which extends into a screw hole formed on the tape recorder 1. The screw 15 is rotated by turning a knob 16. The same side of the body 11 has a plurality of connector terminals 17a-17d (four terminals in this example). These terminals 17a-17d are connected to the internal circuit of the tape recorder through the corresponding connector terminals on the tape recorder when the body 11 is mounted to it. Denoted as 18 is a level changeover switch.

Figure 4:
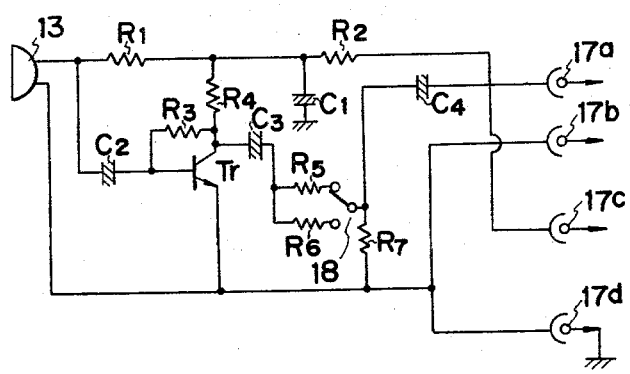
FIG. 4 is a circuit diagram of the microphone device of FIG. 2.

An electric circuit in the body 11 of the microphone device is shown in FIG. 4. One (first) of the two terminals of the microphone 13 is connected via resistors R1 and R2 to a connector terminal 17c, and the connecting point between the two resistors R1 and R2 is grounded through a capacitor C1. The other (second) terminal of the microphone 13 is connected to connector terminals 17b, 17d. The connecting point between the first terminal of the microphone 13 and the resistor R1 is connected to the base of the transistor Tr via a capacitor C2. The emitter of this transistor Tr is connected to the connector terminal 17d, and its collector is connected through a resistor R3 to the base. The collector of the transistor is also connected to the connecting point between the resistors R1 and R2 through a resistor R4. Furthermore, the collector is connected to the normally closed contact of the level changeover switch 18 via a capacitor C3 and resistor R5. A normally open contact of the changeover switch 18 is connected to the connecting point between the capacitor C3 and the resistor R5. The movable contact of the changeover switch 18 is connected with the connector terminal 17a through a capacitor C4 and also with the connector terminal 17d via a resistor R7.

These connector terminals 17a-17d are connected to the internal circuit of the tape recorder 1 via the corresponding connector terminals on the tape recorder 1. The connector terminal 17a is connected with an external microphone input circuit, the terminal 17b with a built-in microphone operation interrupting circuit, the terminal 17c with a power supply circuit, and the terminal 17d with a grounding circuit. In the circuit shown in FIG. 4, the operation of the microphone built into the tape recorder is stopped by the connector terminal 17b and the attached microphone 13 is supplied DC power from the tape recorder 1 through the connector terminal 17c. The sound received by the microphone 13 is converted into an electric signal which is then amplified by the amplifying circuit of the transistor Tr and supplied through the connector terminal 17a to an external microphone input circuit of the tape recorder 1 where it is recorded.

The body 11 of the microphone device 10 can be secured to one end of the tape recorder 1 by the set screw 15, as shown in FIG. 1. The connector terminals 17a-17d are automatically connected to the corresponding connector terminals on the tape recorder 1 when the body 11 is mounted to the tape recorder 1.

In this construction, by expanding or contracting the arm it is possible to extend the microphone to a desired location because the conductor electrically connecting the microphone 13 to the body 11 is also flexible. Thus, when one has to tape-record the conversation from behind a crowd of people, one can extend the microphone and bring it close enough to the speaker. This ensures good tape-recording. Furthermore, since the microphone receives electricity from the power source of the tape recorder via the connector terminals, with the body 11 mounted to the tape recorder, the microphone device can be made smaller in size and weight than the conventional ones which require a separate power source for the microphone. This results in easier handling of the device.

Figure 5:
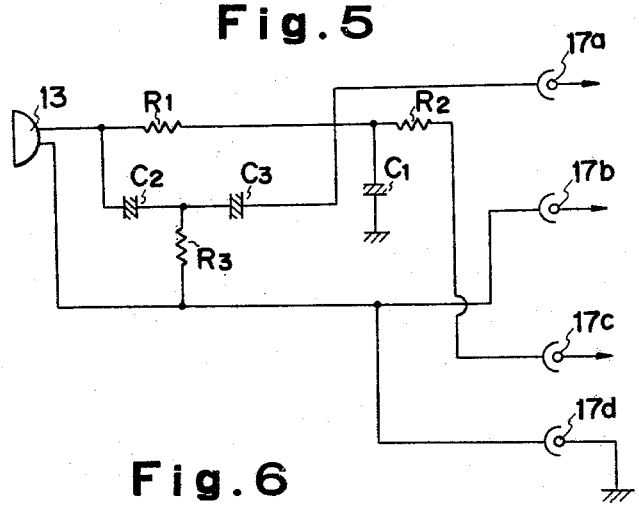
FIGS. 5 and 6 are other circuit diagrams of the microphone device.
Figure 6:
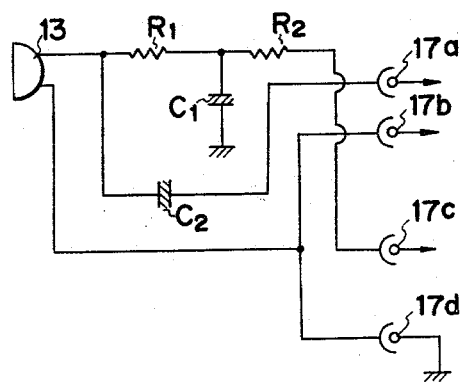

In addition, the present invention is not limited to the above embodiment but can be modified within the scope of the claims. For example, the electric circuit in the body 11 described above may be modified and constructed as shown in FIGS. 5 and 6. The relation between the internal circuit of the tape recorder and the connector terminals 17a-17d in cases of FIGS. 5 and 6 are almost the same as the foregoing example.

While in the above embodiment two conductors 14 are used for electrically connecting the microphone 13 and the body 11, one of the conductors 14 that is to be grounded may be formed integral with the arm 12 so that a single conductor is contained in the arm. Although the above embodiment deals with the case where the microphone device is mounted to the tape recorder, it is apparent that this device can also be applied to other acoustic equipments.

What is claimed is:

1. A microphone device for use with acoustic equipment, comprising a body detachably mountable on the acoustic equipment, an extensible and contractable elongated arm on the body, a microphone fitted to the free end of the arm, and extensible and contractable elongated conductor means disposed in the arm for electrically connecting the microphone with the body.

2. A microphone device as set forth in claim 1, wherein said microphone is a condenser microphone.

3. A microphone device as set forth in claim 1, wherein said body includes a housing, a screw passing through the housing, a knob on the screw for turning the screw, connector terminals on the housing, said screw securable in a corresponding screw hole on the acoustic equipment, said connector terminals being connectable to corresponding connector terminals on the acoustic equipment so as to detachably mount and electrically connect the microphone device to the acoustic equipment.

4. A microphone device as set forth in claim 3, wherein said microphone device includes an amplifying circuit supplied with electricity from the acoustic equipment.

5. A microphone device as set forth in claim 1, wherein said conductor means forms two conductors, one of the two conductors being formed integrally with the arm and the other being contained in the arm.

6. A device as in claim 1, wherein said conductor means includes two extensible conductors in the arm.

* * * * *